US006212587B1

(12) United States Patent
Emerson et al.

(10) Patent No.: US 6,212,587 B1
(45) Date of Patent: *Apr. 3, 2001

(54) DEVICE PROXY AGENT FOR HIDING COMPUTING DEVICES ON A COMPUTER BUS

(75) Inventors: Theodore F. Emerson, Houston; Christopher J. McCarty, Spring, both of TX (US)

(73) Assignee: Compaq Computer Corp., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,345

(22) Filed: Dec. 10, 1997

(51) Int. Cl.$^7$ ........................................... G06F 13/38
(52) U.S. Cl. ............................... 710/107; 710/100
(58) Field of Search ........................... 395/308, 309, 395/280, 306, 310, 821, 287; 710/128, 129, 100, 126, 130, 1, 107

(56) References Cited

U.S. PATENT DOCUMENTS

| 5,548,730 | * | 8/1996 | Young et al. | ............. | 395/280 |
| 5,734,847 | * | 3/1998 | Garbus et al. | ............. | 395/308 |

OTHER PUBLICATIONS

Mendel, Brett; "Server I/O all set to flow"; *Lantimes*, Oct. 27, 1997, vol. 14, Issue 22; cover page and p. 31.
Briggs, Chris; "Smarter and Faster I/O for Servers"; CORE: Operating Systems; *Byte*, May 1, 1996, vol. 2, No. 5.
Thompson, Tom; "I2O Beats I/O Bottlenecks"; *Byte*, Aug. 1997, pp. 85, 86 and 3 additional pages.
I2O Introduction; Technology Backgrounder; Aug. 13, 1997; http://www.i2osig.org/Architecture/TechBack.html.
i960®RP I/O Processor—the I2O SIG site; http://134.134.214.1/design/iio/i2osig.html; Feb. 6, 1998.
"Welcome to the I2O SIG® Web Site!"; http://www.i2osig.org; Feb. 6, 1998.
"About I2O Technology"; http://www.i2osig.org/Architecture; Feb. 6, 1998.
"Technology Backgrouder"; http://www.i2osig.org/Architecture/TechBack.html; Feb. 6, 1998; 6 pages.
"Questions and Answers"; http://www.i2osig.org/Architecture/QandA.html; Feb. 6, 1998; 4 pages.
"I2O® Specification For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.

*Primary Examiner*—Robert Beausoleil
*Assistant Examiner*—Tim Vo
(74) *Attorney, Agent, or Firm*—Fletcher, Yoder & Van Someren (57) ABSTRACT

A system for hiding computing devices on a computer bus comprising a computer memory for storing information pertaining to computing devices, a device proxy agent for reserving memory for storing information pertaining to hidden devices and an IOP, which in conjunction with the device proxy agent, assigns the memory space assigned to the device proxy agent to hidden devices. A section of memory is allocated as memory address space for the computer bus. A first portion of the allocated memory address space is assigned to non-hidden computing devices and a second portion of the allocated memory address space is assigned to the device proxy agent. The IOP in conjunction with the device proxy agent assigns the memory address space assigned to the device proxy agent to the hidden devices.

10 Claims, 10 Drawing Sheets

OTHER PUBLICATIONS

Goble, Scott, et al.; "Intelligent I/O Architecture"; http://www.i2osig.org; Jun. 1996; 22 pages.

"Press Releases and Clips"; http://www.i2osig.org/Press; Feb 6, 1998; 4 pages.

Listing of Press Releases ; http://altavista.digital.com/cgi-bin/quer . . . =21%2FMar%2F86&d1=&search.x=46&search.y=6; Feb 6, 1998; 2 pages.

Crothers, Brooks; "Intel server chip gets big backing", Oct. 7, 1997; http://www.news.com/News/Item/0,4,14962,00.html; Feb. 6, 1998.

"HP Demonstrates Commitment to I2O Standard With New I2O Disk–array Controller"; Hewlett Packard; Press Release, Atlanta, Oct. 8, 1997; http://hpcc920.external.hp.com/pressrel/oct 97/08oct97b.html; Feb. 6, 1998; 2 pages.

"I2O: Disaster in the making for the freeware community"; http://22.kenandted.com/i2o/disaster.html; Feb. 6, 1998; 2 pages.

* cited by examiner

| | | | | |
|---|---|---|---|---|
| DEVICE ID $ D0 : $ 00 | | VENDOR ID $ DE : $ 11 | | 00h |
| CLASS CODE $ 04 : $ 00 | | COMMAND | MEM | 04h |
| $ 06 | CLASS CODE $ 80 | $ 00 | REVISION ID $ 00 | 08h |
| BIST | HEADER TYPE $ 80 | LATENCY TIMER | CACHE LINE SIZE | 0Ch |
| | | $ 0_0000 | | 10h |
| BASE ADDRESS REGISTER | | | | 14h / 18h / 1Ch / 20h / 24h |
| RESERVED | | | | 28h |
| SUBSYSTEM DEVICE ID $ D0 : $ 00 | | SUBSYSTEM VENDOR ID $ 0E : $ 11 | | 2Ch |
| EXPANSION ROM BASE ADDRESS | | | | 30h |
| RESERVED | | | | 34h |
| RESERVED | | | | 38h |
| MAX_LAT | MIN_GNT | INTERRUPT PIN | INTERRUPT LINE | 3Ch |
| RESERVED | | | DRAGSTER CONTROL | 40h |

DEVICE PROXY AGENT FOR HIDING COMPUTING DEVICES ON A COMPUTER BUS

FIELD OF THE INVENTION

The present invention relates in general to configuring of computing devices on a computer bus, and more particularly, but not by way of limitation, to a method and apparatus for hiding computing devices connected to a Peripheral Component Interface bus from a host Central Processing Unit connected to the Peripheral Component Interface bus.

BACKGROUND OF THE INVENTION

Computer systems have achieved wide usage in modern society. During operation, a computer system processes and stores data at a speed and at a level of accuracy many times that which can be performed manually. Successive generations of computer systems have permitted ever-increasing amounts of data to be processed at ever-increasing rates.

Computer systems are sometimes operated as stand-alone devices or connected together by way of network connections, typically together with a network server, to form a computer network. When networked together, communication between the separate computer systems is possible. Files and other data, stored or generated at one computer system, can be transferred to another computer system.

A conventional computer system typically includes one or more Central Processing Units (CPUs) capable of executing algorithms forming applications and a computer main memory. Peripheral devices, both those embedded together with a CPU or constructed to be separate therefrom, also typically form portions of a conventional computer system. Computer peripheral devices include, for instance, video graphics adapters, Local Area Network (LAN) interfaces, Small Computer System Interface (SCSI) bus adapters, and mass storage devices, such as disk drive assemblies.

A computer system further typically includes computer buses which permit the communication of data between various portions of the computer system. For example, a host bus, a memory bus, at least one high-speed bus, a local peripheral expansion bus, and one or more additional peripheral buses form portions of a typical computer system.

A peripheral bus is formed, for instance, of an SCSI bus, an Extension to Industry Standard Architecture (EISA) bus, an Industry Standard Architecture (ISA) bus, or a Peripheral Component Interface (PCI) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above.

Data is communicated to and from a computer peripheral device by way of a computer bus. A computer peripheral, depending upon its data transfer speed requirements, is connected to an appropriate computer bus, typically by way of a bus bridge that detects required actions, arbitrates, and translates both data and addresses between the various buses.

A computer peripheral device forming a portion of a single computer system might well be supplied by a manufacturer other than the manufacturer of the computer CPU. If the computer system contains more than one peripheral device, the peripheral devices might also be supplied by different manufacturers. Furthermore, the computer system may be operable pursuant to any of several different operating systems. The various combinations of computer peripheral devices and computer operating systems of which a computer system might be formed quickly becomes quite large.

Software drivers are typically required for each computer peripheral device to effectuate its operation. A software driver must be specifically tailored to operate in conjunction with the particular operating system operating on the computer. A multiplicity of software drivers might have to be created for a single computer peripheral to ensure that a computer peripheral device is operable together with any of the different operating systems.

The complexity resulting from such a requirement has led, at least in part, to the development of an Intelligent Input/Output ($I_2O$) standard specification. The $I_2O$ standard specification sets forth, inter alia, standards for an I/O device driver architecture that is independent of both the specific peripheral device being controlled and the operating system of the computer system to which the device driver is to be installed.

In the $I_2O$ standard specification, the portion of the driver that is responsible for managing the peripheral device is logically separated from the specific implementation details of the operating system with which is to be installed. By doing so, the part of the driver that manages the peripheral device becomes portable across different computer and operating systems. The $I_2O$ standard specification also generalizes the nature of communication between the host computer system and peripheral hardware, thus, providing processor and bus technology independence.

In order to incorporate $I_2O$ technology in a computer system and realize the benefits afforded by the $I_2O$ technology, operating systems need to differentiate between peripheral devices which are under the control of an $I_2O$ Input / Output Processor (IOP) and peripheral devices which are not. Although system software which is $I_2O$ compliant is capable of making this distinction, legacy software, that is, software developed and deployed prior to the $I_2O$ standard or which is otherwise not $I_2O$ compliant, cannot. Therefore, to retain the investment made in the legacy software through its continued use while at the same time realizing the benefits of the $I_2O$ technology, an alternate approach is needed to make the distinction. The current method used to address this problem involves the use of a PCI-to-PCI bridge and an i960 private address space mechanism both of which are well known in the industry. Devices under the control of an $I_2O$ IOP are "hidden" from the host CPUs and their related software by placing these devices behind a PCI-to-PCI bridge and allocating memory space to the PCI bus behind the bridge for storing information pertaining to these devices. The address space allocated to the PCI bus behind the bridge is inaccessible by the host CPUs and, thus, the host CPUs do not know of the existence of these devices and cannot directly access them. All access to these devices is effectuated via the $I_2O$ IOP.

A limitation of the current approach of hiding devices under the control of an $I_2O$ IOP is that they need to be placed behind the bridge thereby requiring a PCI-to-PCI bridge and its associated hardware and software which adds additional cost to the computer system. It would be advantageous, therefore, to devise a method and apparatus capable of hiding peripheral computing devices located in front of the bridge from host CPUs. Such a method and apparatus would prevent host CPUs from attempting to access the devices which are under the control of the $I_2O$ IOP.

SUMMARY OF THE INVENTION

The present invention comprises a method and apparatus for hiding computing devices on a computer bus comprising a computer memory for storing information pertaining to computing devices, a device proxy agent for reserving memory for storing information pertaining to hidden devices and an IOP, which in conjunction with the device proxy agent, assigns the memory space assigned to the device proxy agent to hidden devices. A section of memory is allocated as memory address space for the computer bus. A first portion of the allocated memory address space is assigned to non-hidden computing devices and a second portion of the allocated memory address space is assigned to the device proxy agent. The IOP in conjunction with the device proxy agent assigns the memory address space assigned to the device proxy agent to the hidden devices.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

The present invention incorporates by reference all material contained in the appendix attached hereto. The appendix describes implementation of "Dragster," which is an example of a preferred embodiment of the present invention.

Figure 1:
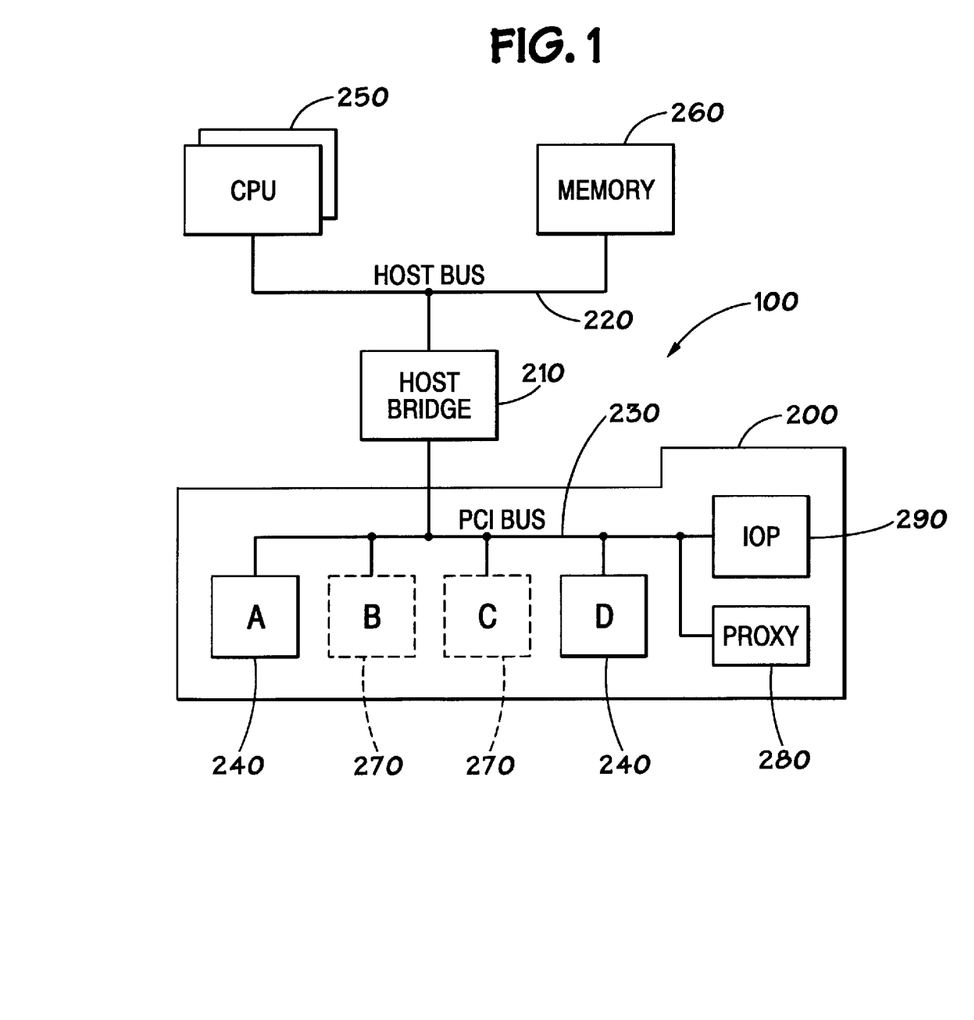
FIG. 1 is a functional block diagram of a computer system including a PCI bus segment and a device proxy agent operable in a manner consistent with a preferred embodiment of the present invention.

Referring now to FIG. 1, there is a functional block diagram of a computer system including a PCI bus segment and a hidden device proxy agent operable in a manner consistent with a preferred embodiment of the present invention. A computer system, shown generally at 100, comprises a PCI bus segment 200, located on a PCI bus 230, and a host bridge 210. The host bridge 210 provides an interface between a system bus 220 and the PCI bus segment 200. Alternatively, the host bridge 210 can be any device which interfaces the PCI bus segment 200 to either the system bus, other portions of a larger PCI bus or another PCI bus. An example of an alternate host bridge 210 is a PCI-to-PCI bridge.

The PCI bus segment 200 typically includes one or more non-hidden peripheral devices 240 connected to the PCI bus 230 which are not hidden from the host CPUs 250. The non-hidden peripheral devices 240 can be any computing device including, but not limited to, video graphics adapters, LAN interfaces, SCSI bus adapters, and mass storage devices, such as disk drive assemblies. Memory space for storing information pertaining to each of the non-hidden peripheral devices 240 is accessible by the host CPUs 250. Therefore, the host CPUs 250 can detect the presence of the non-hidden peripheral devices 240 and can access them directly without intervention of an IOP 290.

The PCI bus segment 200 also includes one or more hidden peripheral devices 270 connected to the PCI bus 230 which are hidden from the host CPUs 250. The hidden peripheral devices 270 also include, but are not limited to, video graphics adapters, LAN interfaces, SCSI bus adapters, and mass storage devices, such as disk drive assemblies. Memory space for storing information pertaining to each of the hidden peripheral devices 270 is inaccessible by the host CPUs 250 and, therefore, the host CPUs 250 are unable to detect the presence of the hidden peripheral devices 270 and cannot access them directly without the intervention of the IOP 290.

To hide the hidden devices 270, memory address space is initially assigned to a device proxy agent 280 rather than to the hidden devices 270. Although from the point of view of the host CPUs 250, the memory space appears to be assigned to the proxy agent, the memory space is actually used by the IOP 290 to store information pertaining to the hidden devices 270. Since the memory space is assigned to the device proxy agent, the host CPUs do not "see" the hidden devices 270 and do not attempt to communicate with them directly. The existence of the functionality provided by the hidden devices 270, however, is known to the host CPUs 250 via the IOP 290 and access by the host CPUs 250 to the functionality of the hidden devices is effectuated via the IOP 290 which oversees operation of the hidden devices 270.

Figure 2:
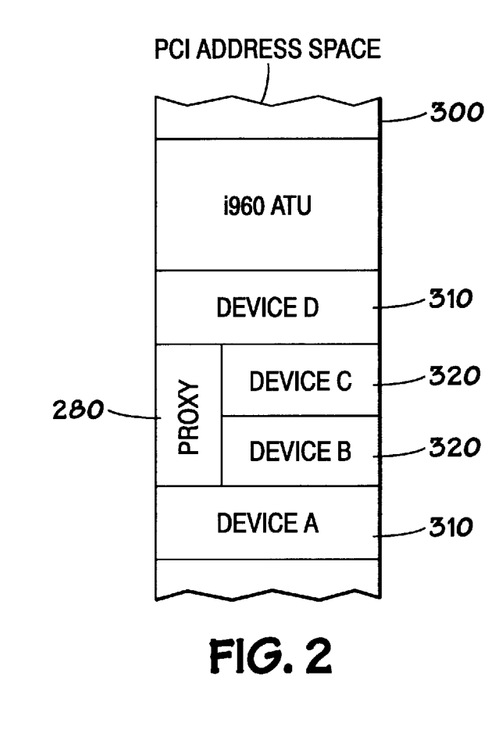
FIG. 2 is a block diagram of allocated PCI bus address space incorporating a device proxy agent.

Referring additionally now to FIG. 2, there is a block diagram of allocated PCI bus address space incorporating a device proxy agent. A portion of the memory 260 is allocated as PCI address space 300. Among other purposes, the PCI address space 300 is used to store information pertaining to both non-hidden devices 240 and hidden devices 270. The PCI address space 300 includes a first portion of memory 310 for storing information pertaining to the non-hidden devices 240 and a second portion of memory 320 for storing information pertaining to the hidden devices 270. The first portion of memory space 310 is directly associated with the non-hidden devices 240 from the reference points of both the host CPUs 250 and the PCI bus 230. On the other hand, the second portion of memory 320 is associated with a proxy device agent 280 from the reference point of the host CPUs 250 and associated with hidden devices 270 from the reference point of the PCI bus 230. The host CPUs 250 associate the second portion of memory 320 as allocated to the device proxy agent 280 and do not access this memory space.

Figure 3:
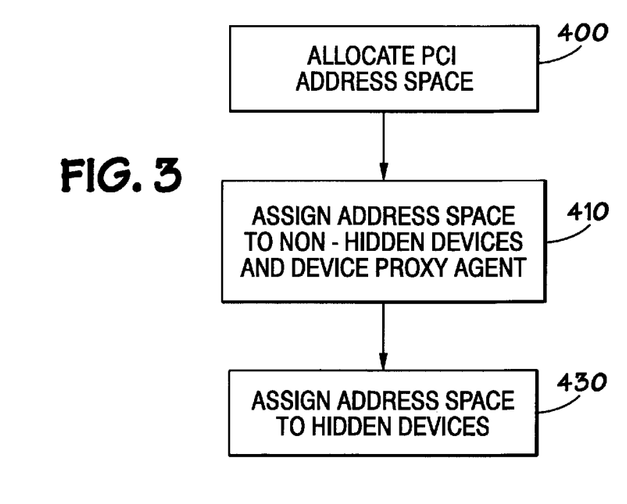
FIG. 3 is a flow diagram of a method for hiding a device using a device proxy agent consistent with a preferred embodiment of the present invention.

Referring additionally now to FIG. 3, there is illustrated a flow diagram of a method for hiding a device using a hidden device proxy agent consistent with a preferred embodiment of the present invention. A portion of memory space is allocated as PCI address space 300 (step 400). Within the allocated PCI address space 300, a first portion of memory space 310 is assigned to the non-hidden devices 240 and a second portion of memory space 320 is assigned to the device proxy agent 280 (step 410). The device proxy agent 280, in conjunction with the IOP 290, assigns address space to the hidden devices 270 (step 430).

Figure 4:
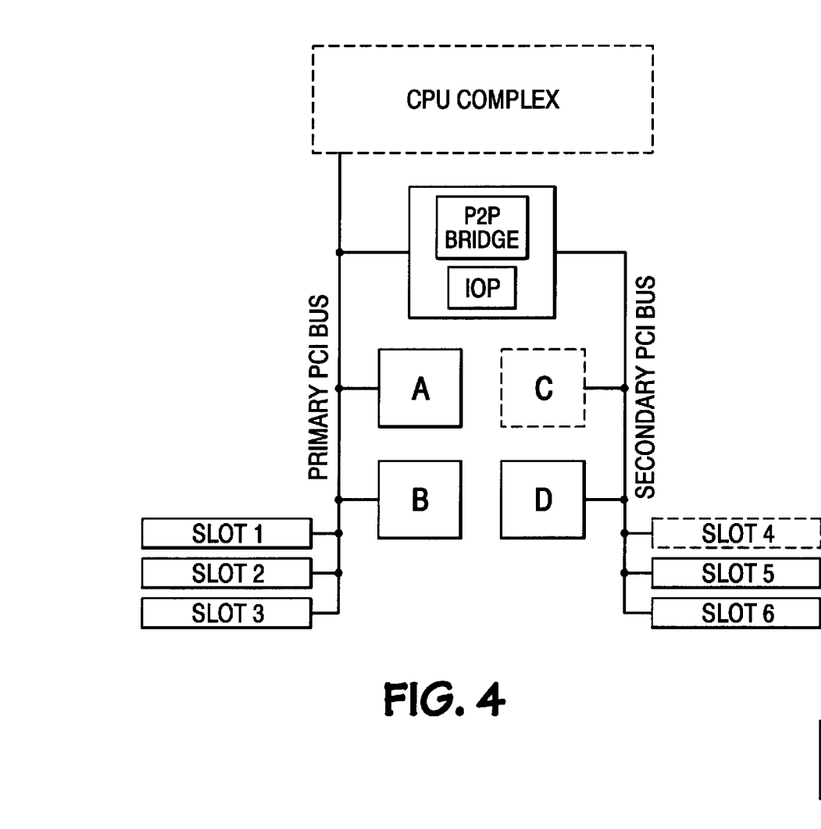
FIG. 4 is a functional block diagram of a basic Intel motherboard i960 implementation.

Referring now to FIG. 4, there is illustrated a functional block diagram of a basic Intel motherboard i960 implementation. FIG. 4 corresponds to FIG. 2-1 of the attached appendix. FIG. 4 is described in greater detail in the appendix attached hereto.

Figure 5:
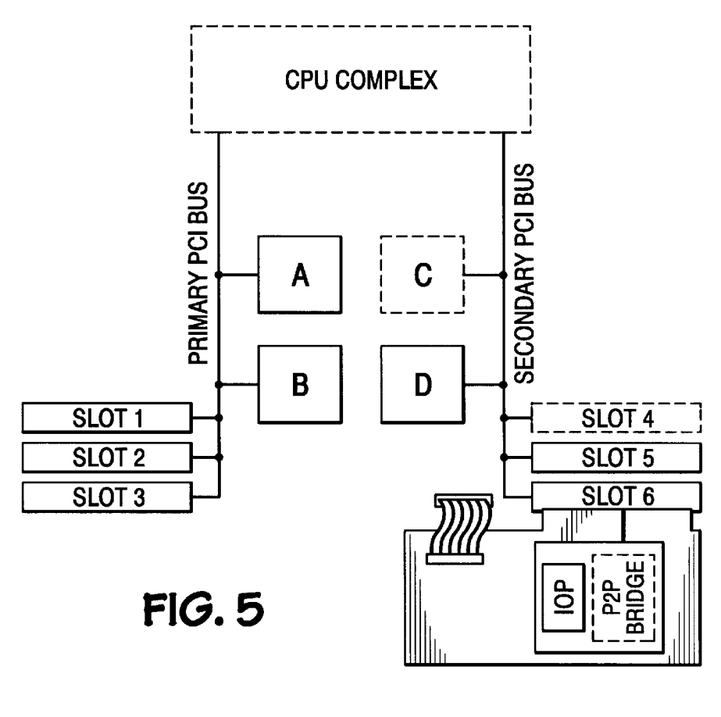
FIG. 5 is a functional block diagram of a Dragster look-aside architecture.

Referring now to FIG. 5, there is illustrated a Dragster look-aside architecture. FIG. 5 corresponds to FIG. 2—2 of the attached appendix. FIG. 5 is described in greater detail in the appendix attached hereto.

Figure 6:
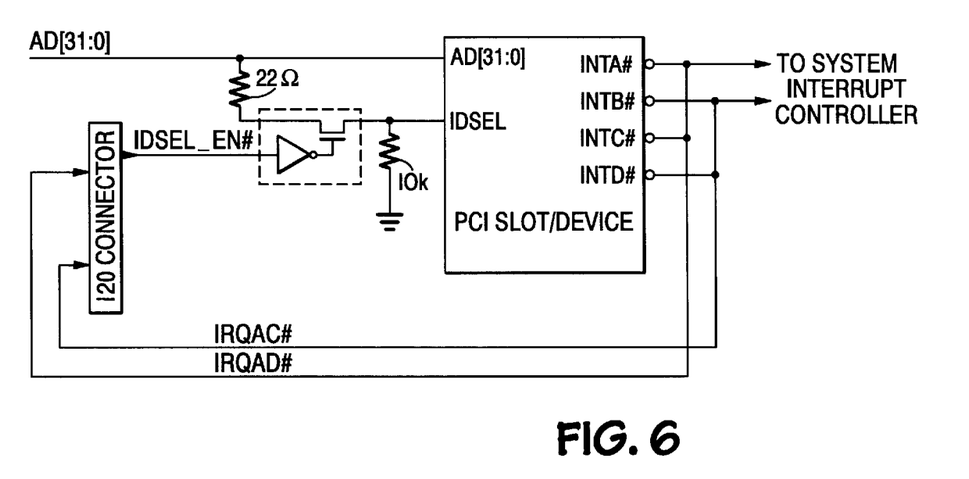
FIG. 6 is a functional block diagram of a system board support for an I$_2$O connector.

Referring now to FIG. 6, there is illustrated a system board support for an $I_2O$ connector. FIG. 6 corresponds to FIG. 2-3 of the attached appendix. FIG. 6 is described in greater detail in the appendix attached hereto.

Figure 7:
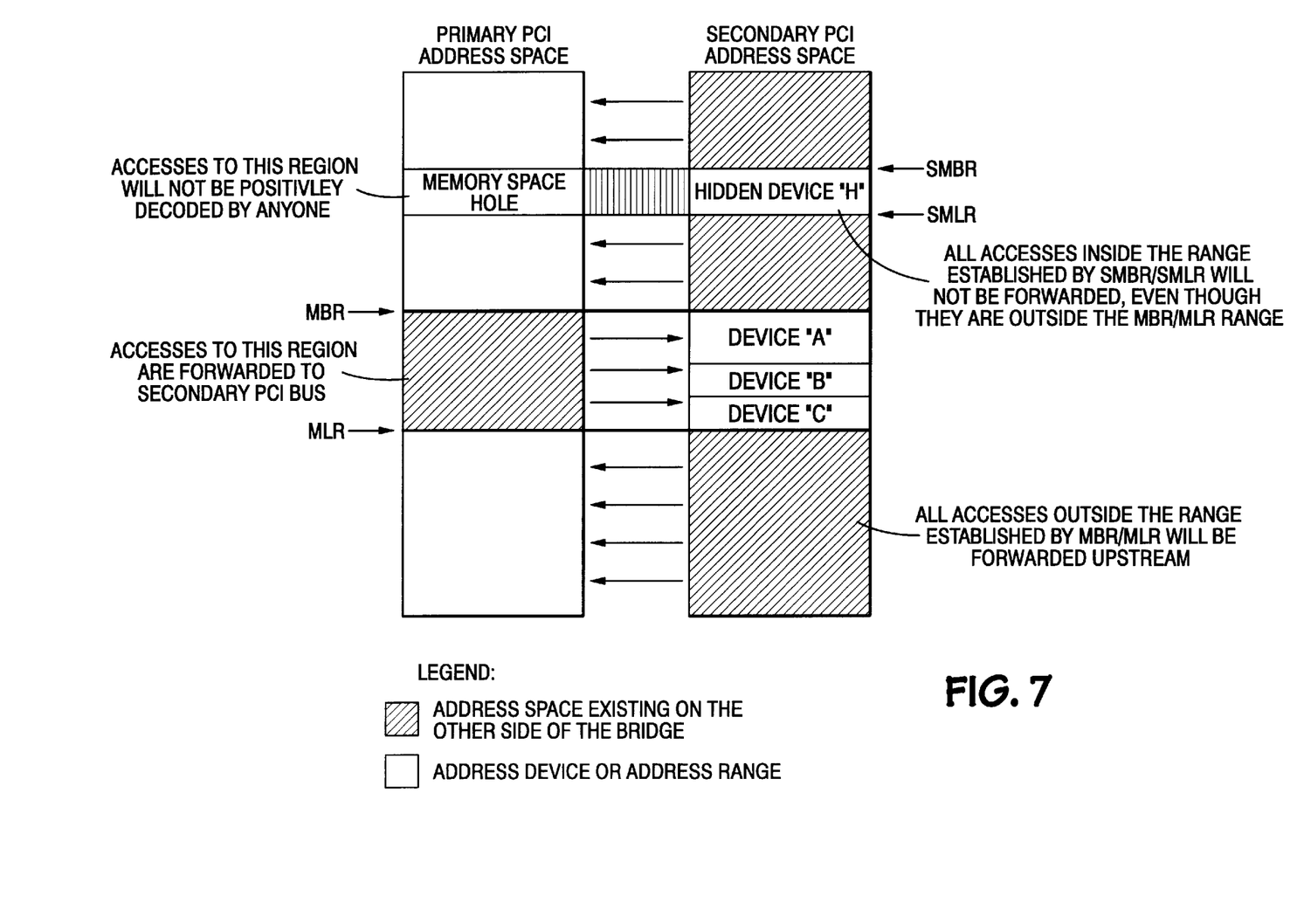
FIG. 7 is a functional block diagram of an i960 hidden device mechanism.

Referring now to FIG. 7, there is illustrated an i960 hidden device mechanism. FIG. 7 corresponds to FIG. 3-1 of the attached appendix. FIG. 7 is described in greater detail in the appendix attached hereto.

Figure 8:
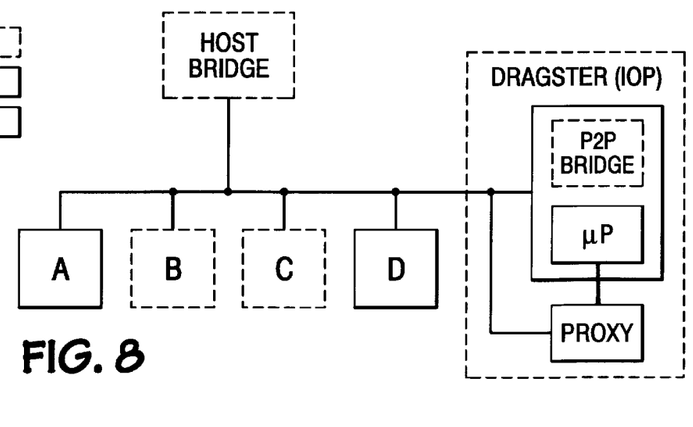
FIG. 8 is a functional block diagram of a hidden device proxy agent.

Referring now to FIG. 8, there is illustrated a hidden device proxy agent. FIG. 8 corresponds to FIG. 4-1 of the attached appendix. FIG. 8 is described in greater detail in the appendix attached hereto.

Figure 9:
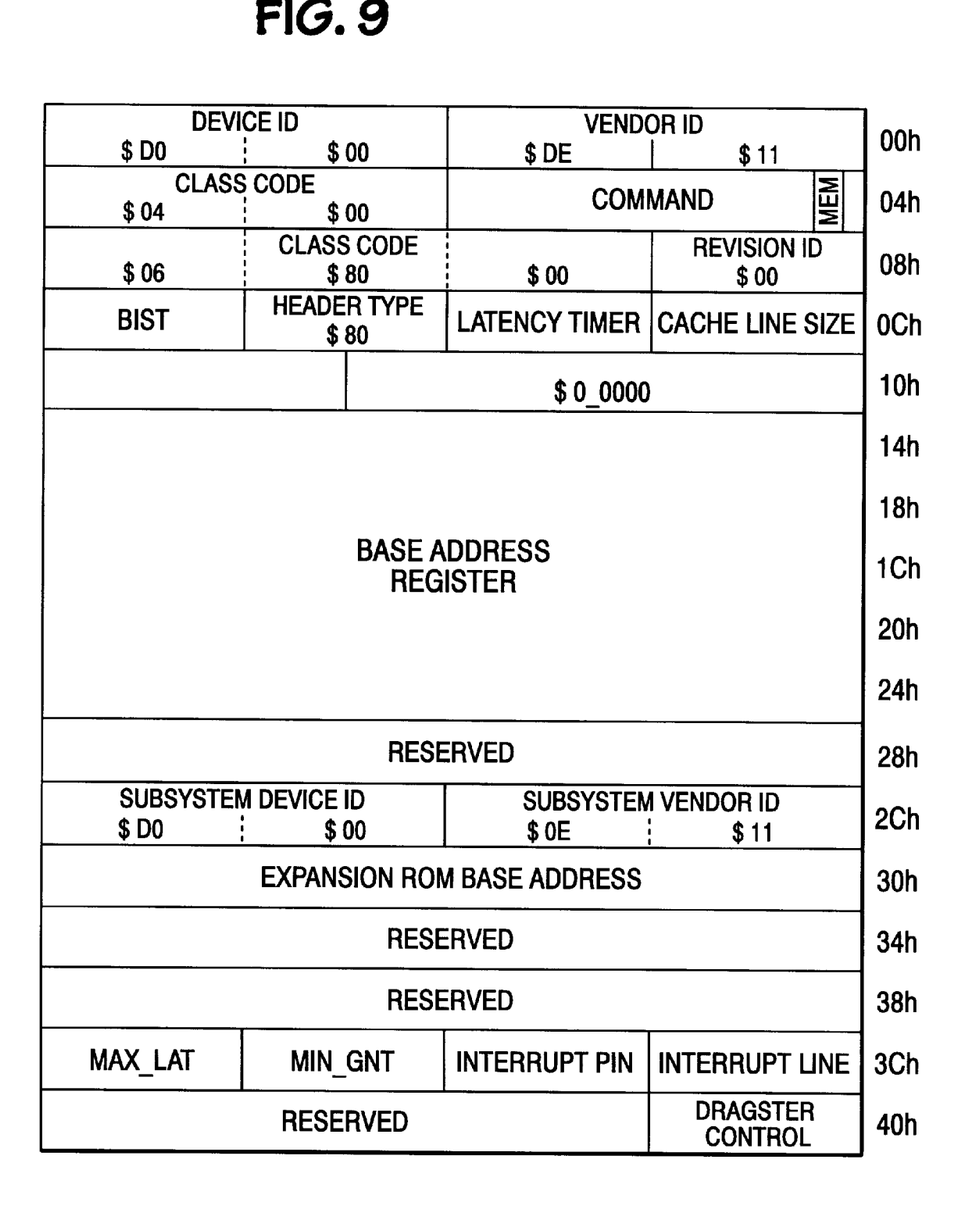
FIG. 9 is a block diagram of a PCI configuration space header.

Referring now to FIG. 9, there is illustrated a PCI configuration space header. FIG. 9 corresponds to FIG. 5-1 of the attached appendix. FIG. 9 is described in greater detail in the appendix attached hereto.

Figure 10:
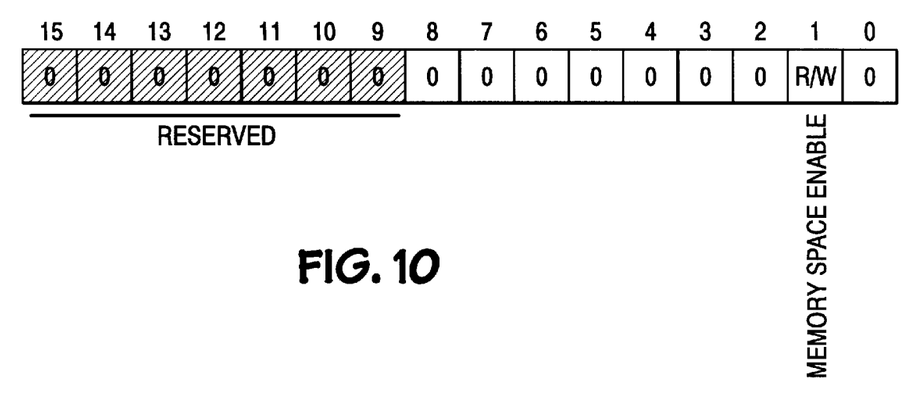
FIG. 10 is a bit description for a command register.

Referring now to FIG. 10, there is illustrated a bit description for a command register. FIG. 10 corresponds to FIG. 5-2 of the attached appendix. FIG. 10 is described in greater detail in the appendix attached hereto.

Figure 11:
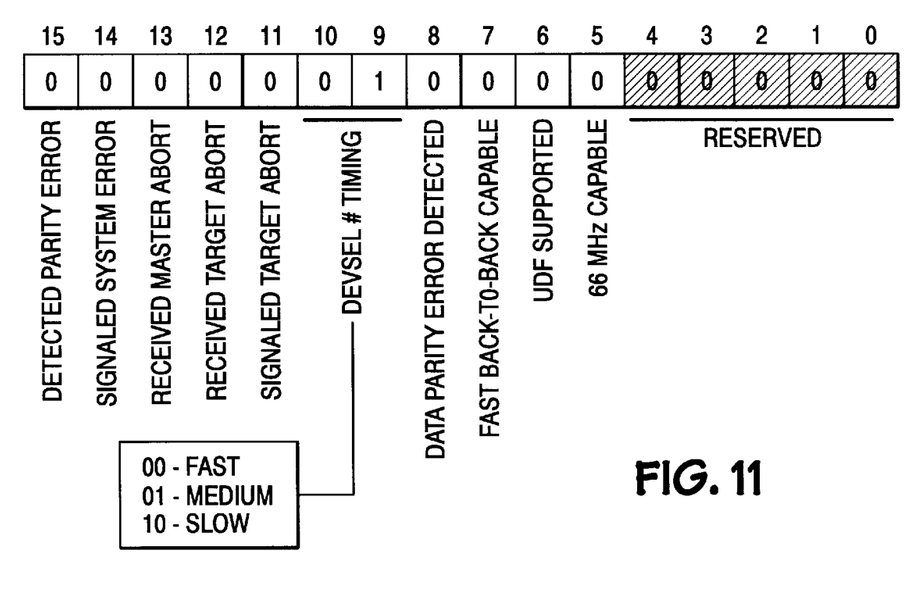
FIG. 11 is a bit description for a status register.

Referring now to FIG. 11, there is illustrated a bit description for a status register. FIG. 11 corresponds to FIG. 5-3 of the attached appendix. FIG. 11 is described in greater detail in the appendix attached hereto.

Figures 12, 13:
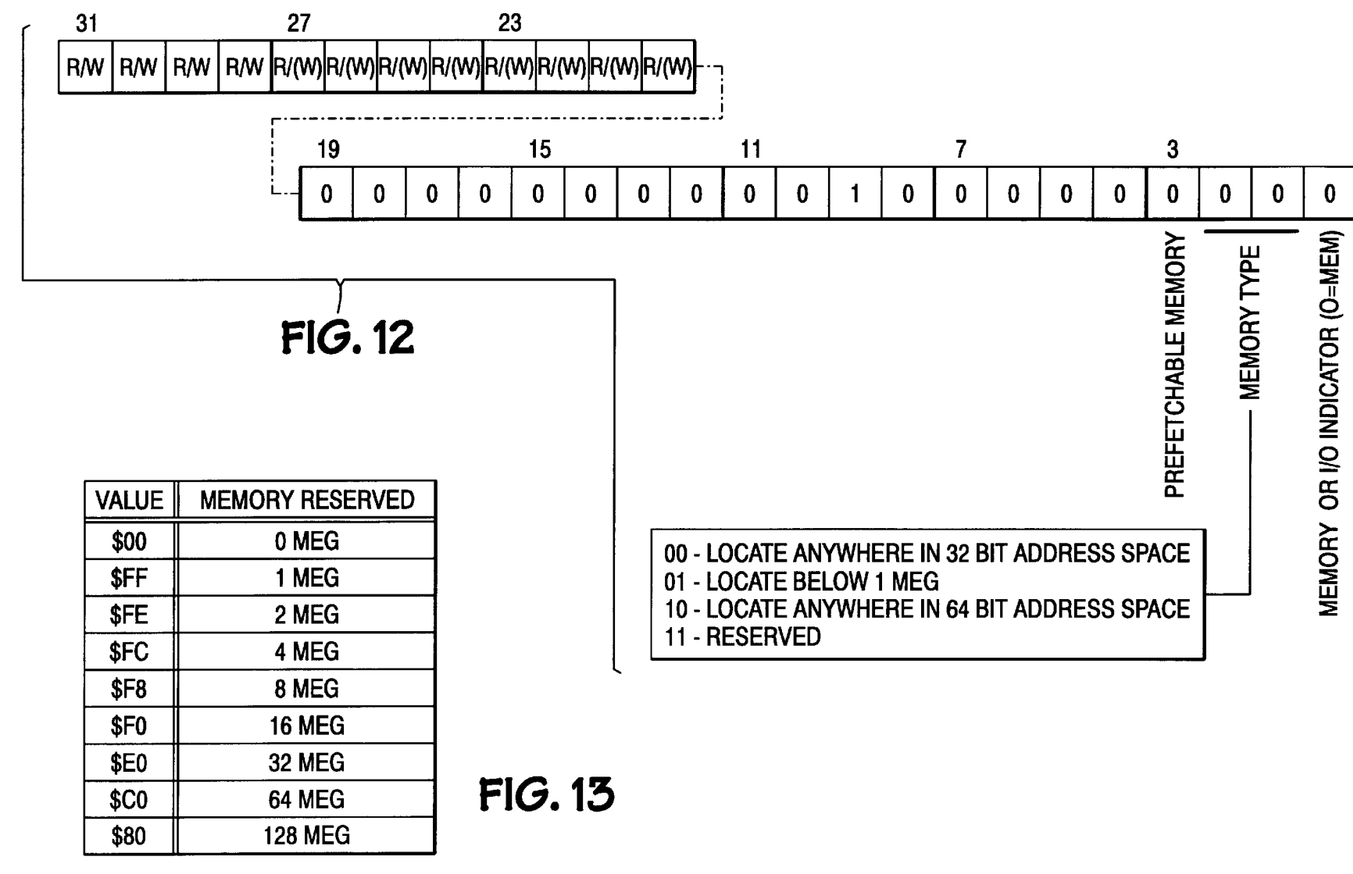
FIG. 12 is a bit description for a proxy memory base address register.
FIG. 13 is a table describing a proxy limit register.

Referring now to FIG. 12, there is illustrated a bit description for a proxy memory base address register. FIG. 12 corresponds to FIG. 5-4 of the attached appendix. FIG. 12 is described in greater detail in the appendix attached hereto.

Referring now to FIG. 13, there is illustrated a table describing a proxy limit register. FIG. 13 corresponds to FIG. 5-1 of the attached appendix. FIG. 13 is described in greater detail in the appendix attached hereto.

Figure 14A:
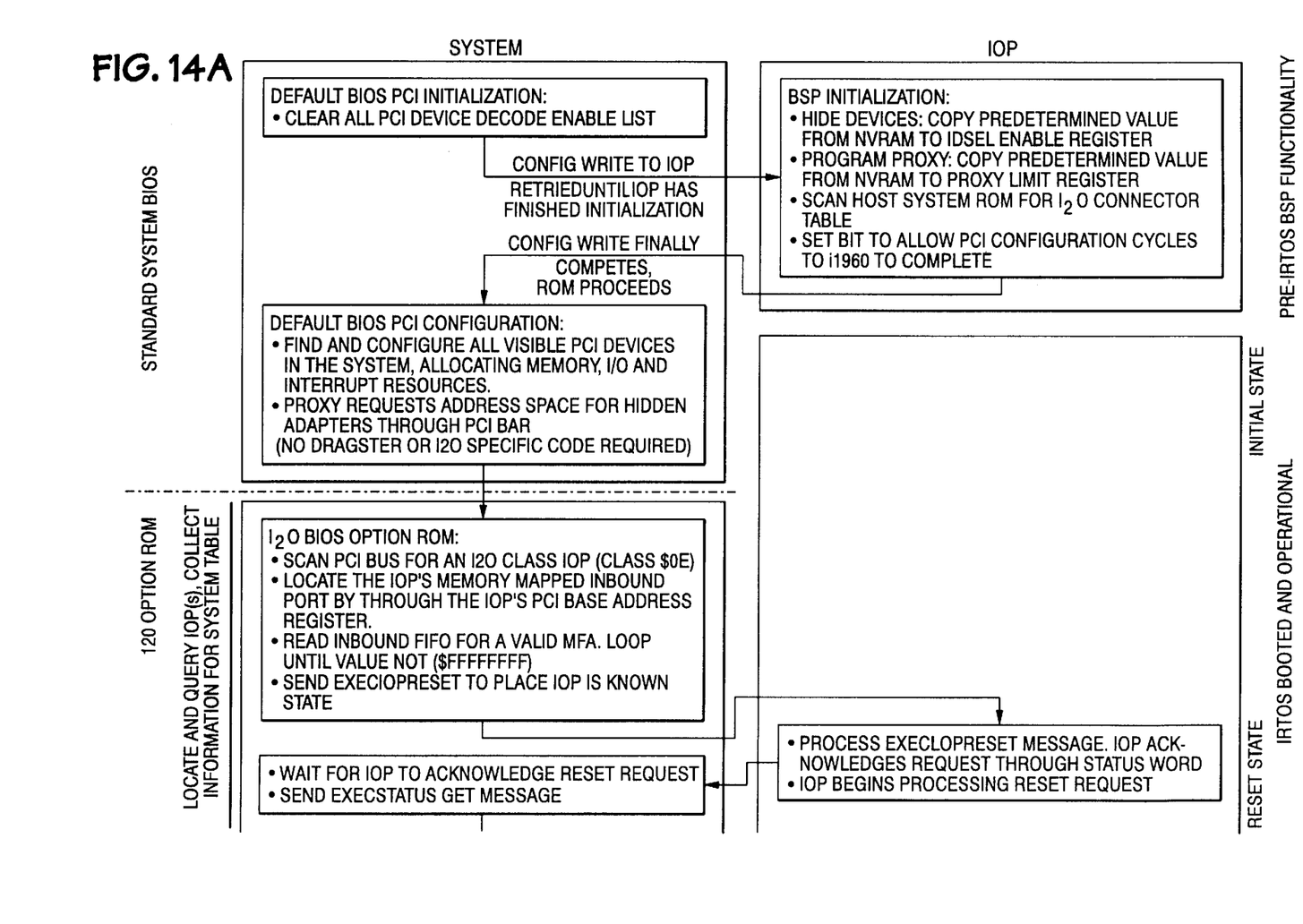
FIG. 14 is a flow diagram for a Dragster initialization.
Figure 14B:
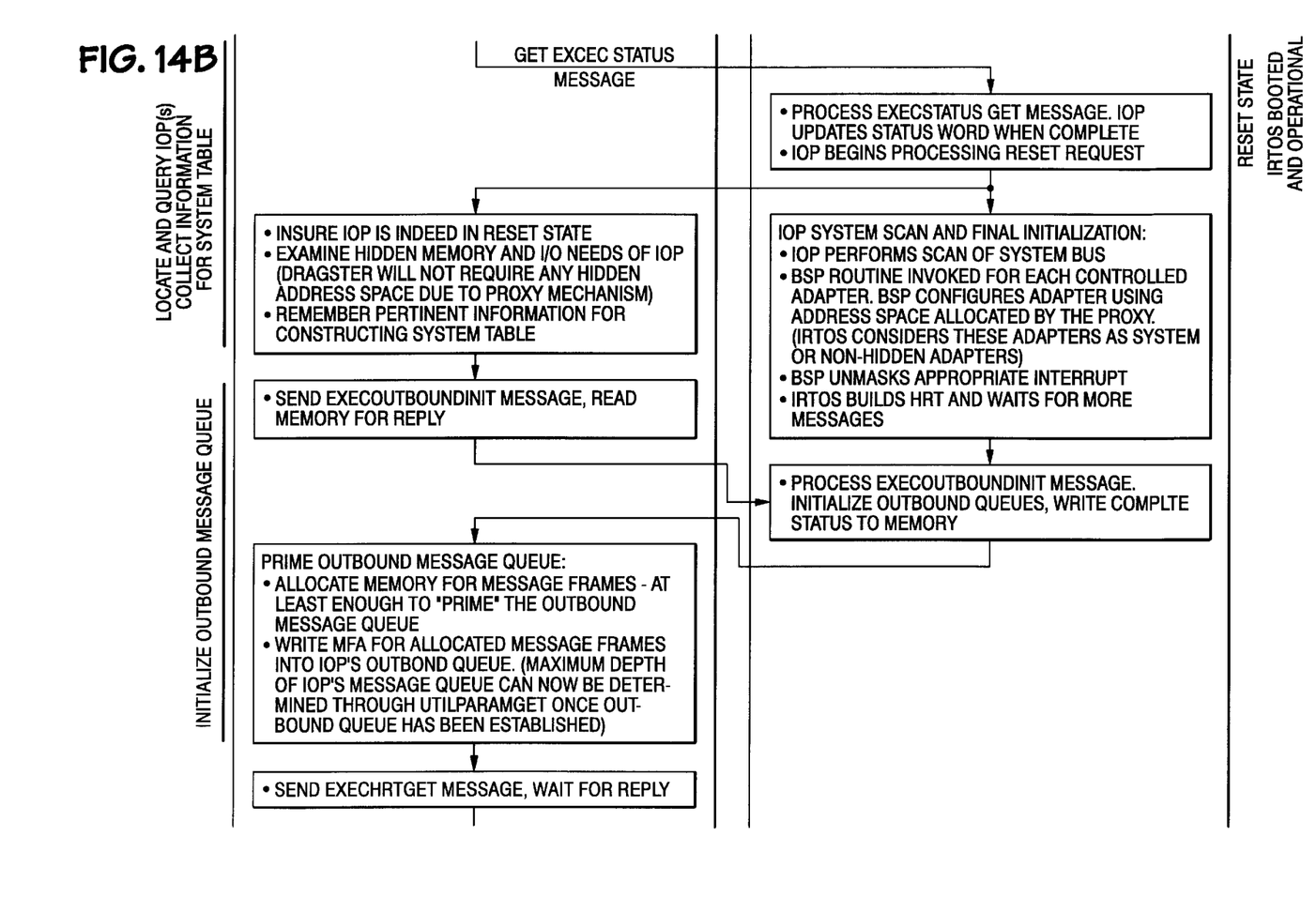
Figure 14C:
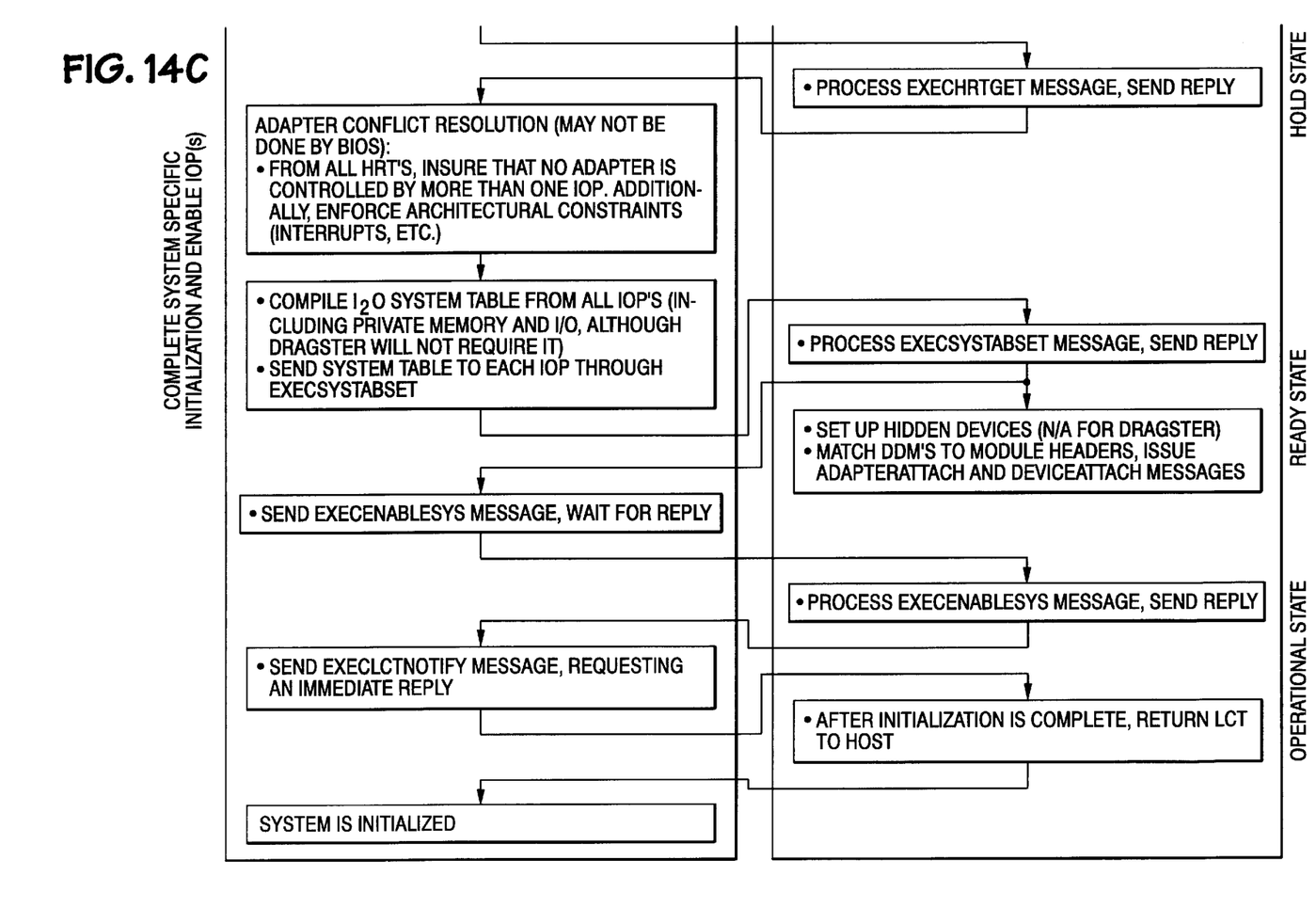

Referring now to FIG. 14, there is illustrated a flow diagram for a Dragster initialization. FIG. 14 corresponds to FIG. 6-1 of the attached appendix. FIG. 14 is described in greater detail in the appendix attached hereto.

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A method for hiding computing devices on a computer bus comprising the steps of:

allocating address space for a computer bus, the computer bus having a first peer device, a second peer device, and a third peer device directly connected thereto;

assigning a first portion of the allocated address space to the first peer device, the first peer device comprising a non-hidden computing device;

assigning a second portion of the allocated address space to the second peer device, the second peer device comprising a device proxy agent, wherein at least a first part of the second portion is assigned to the device proxy agent on behalf of the third peer device the third peer device comprising a hidden device; and allocating, by the device proxy agent, the at least first part of the second portion of the allocated address space to the hidden device, such that the hidden device is addressable through the device proxy agent.

2. The method, as recited in claim 1, wherein the step of allocating at least a first part of the second portion of the allocated address space to a hidden device comprises the steps of:

assigning a second part of the second portion of the allocated address space for memory address space for the hidden device; and assigning a third part of the second portion of the allocated address space for Input/Output address space for the hidden device.

3. The method as recited in claim 1, further comprising the step of:

storing characteristic data related to the hidden device at the second part of the second portion of the allocated address space;

wherein the characteristic data is not directly accessible a central processing unit.

4. The method, as recited in claim 1, wherein the computer bus comprises a primary I/O bus.

5. A method for configuring a computer system comprising the steps of:

assigning a first address space on a primary I/O bus to at least a first computing device the first computing device comprising a non-hidden computing device directly connected to the primary I/O bus;

assigning a second address space on the primary I/O bus to a second computing device, the second computing device comprising a device proxy agent directly connected to the primary I/O bus; and assigning a first portion of the second address space to a third computing device the third computing device comprising a hidden computing device directly connected to the primary I/O bus and controllable by an I/O processor, the hidden device being hidden from a host processor and addressable through the device proxy agent.

6. The method, as recited in claim 5, wherein the step of assigning the first portion of the second configuration space to the hidden computing device comprises the steps of:

assigning Input/Output address space on the primary computer bus for the hidden device, and assigning memory address space on the primary computer bus for the hidden device.

7. A computer system comprising:

a processing subsystem comprising:
 a host processor;
 a memory; and
 a computer bus connected to the host processor and the memory;

an input/output (I/O) subsystem coupled to the processing subsystem, the I/O subsystem comprising:
 a primary I/O bus;

a first device directly connected to the primary I/O bus, the first device being accessible by the host processor;

a proxy agent device directly connected to the primary I/O bus, the proxy agent device being accessible by the host processor;

a second device directly connected to the primary I/O bus, the second device being hidden from the host processor; and an I/O processor connected to the primary I/O bus, wherein the memory comprises a first portion allocated to the first device and a second portion allocated to the proxy agent device, the second portion of the memory including a hidden portion allocated on behalf of the second device;

wherein the hidden portion of the second portion of the memory is not directly available to the host processor, and wherein the proxy agent device and the I/O processor control access to the second device.

8. The computer system as recited in claim 7, wherein the I/O subsystem comprises:

a secondary I/O bus; and an I/O bridge coupled between the primary I/O bus and the secondary I/O bus.

9. The computer system as recited in claim 7, wherein the processing subsystem comprises a host bridge coupled between the computer bus and the primary I/O bus.

10. The computer system as recited in claim 8, wherein the I/O bridge comprises the I/O processor.

* * * * *

UNITED STATES PATENT AND TRADEMARK OFFICE
CERTIFICATE OF CORRECTION

PATENT NO. : 6,212,587 B1
DATED : April 3, 2001
INVENTOR(S) : Theodore F. Emerson et al.

It is certified that error appears in the above-identified patent and that said Letters Patent is hereby corrected as shown below:

Claim 3,
Line 30, insert the word -- by -- after the word "accessible".

Signed and Sealed this

Sixteenth Day of October, 2001

Attest:

*Attesting Officer*

NICHOLAS P. GODICI
*Acting Director of the United States Patent and Trademark Office*